(12) United States Patent
Cheng et al.

(10) Patent No.: US 12,124,149 B2
(45) Date of Patent: Oct. 22, 2024

(54) ELECTROPHORETIC DISPLAY DEVICE AND MANUFACTURING METHOD THEREOF

(71) Applicant: E Ink Holdings Inc., Hsinchu (TW)

(72) Inventors: Hsiao-Lung Cheng, Hsinchu (TW); Pei-Lin Tien, Hsinchu (TW); I-Shin Lo, Hsinchu (TW); Chi-Mao Hung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 400 days.

(21) Appl. No.: 17/371,067

(22) Filed: Jul. 8, 2021

(65) Prior Publication Data

US 2022/0057689 A1 Feb. 24, 2022

(30) Foreign Application Priority Data

Aug. 20, 2020 (TW) ................................. 109128358

(51) Int. Cl.
*G02F 1/16756* (2019.01)
*G02F 1/167* (2019.01)
(Continued)

(52) U.S. Cl.
CPC .......... *G02F 1/16756* (2019.01); *G02F 1/167* (2013.01); *G02F 1/16755* (2019.01); *G02F 1/1676* (2019.01); *G02F 1/1679* (2019.01)

(58) Field of Classification Search
CPC ............. G02F 1/1368; G02F 1/134309; G02F 1/13452; G02F 2202/28; G02F 1/13439;
(Continued)

(56) References Cited

U.S. PATENT DOCUMENTS 6,219,113 B1   4/2001 Takahara
6,628,355 B1 * 9/2003 Takahara ............. H04N 9/3167
                                                              349/86

FOREIGN PATENT DOCUMENTS

CN        103424950        12/2013
CN        104280973        1/2015
(Continued)

OTHER PUBLICATIONS

"Office Action of Taiwan Counterpart Application", issued on Jan. 19, 2021, p. 1-p. 8.
(Continued)

*Primary Examiner* — Brandi N Thomas
(74) *Attorney, Agent, or Firm* — JCIPRNET (57) ABSTRACT

An electrophoretic display device, including a substrate, a first conductive layer, multiple insulating patterns, a second conductive layer, an adhesive layer, and an electrophoretic display film, is provided. The first conductive layer is disposed on the substrate, and includes multiple background patterns and multiple signal lines. Each of the signal lines is located between two adjacent background patterns. Each of the insulating patterns covers each of the signal lines and bridges to the two adjacent background patterns. The second conductive layer includes multiple conductive patterns. Each of the conductive patterns covers the each of the insulating patterns and bridges to the two adjacent background patterns. The adhesive layer is disposed on and in direct contact with the background pattern and the second conductive layer. The electrophoretic display film is disposed above the adhesive layer.

10 Claims, 7 Drawing Sheets

(51) Int. Cl.
  *G02F 1/16755* (2019.01)
  *G02F 1/1676* (2019.01)
  *G02F 1/1679* (2019.01)

(58) Field of Classification Search
  CPC .......... G02F 1/136286; G02F 1/13306; G02F 1/1339; G02F 1/1341; G02F 1/13454; G02F 1/13456; G02F 1/136222; G02F 1/136227; G02F 1/133345; G02F 1/13624; G02F 1/163; G02F 2201/40; G02F 1/13338; G02F 1/133516; G02F 1/133707; G02F 1/1345; G02F 1/136; G02F 1/1506; G02F 1/1508; G02F 1/15165; G02F 1/1533; G02F 1/155; G02F 1/161; G02F 1/133; G02F 1/133305; G02F 1/133377; G02F 1/133394; G02F 1/1337; G02F 1/133742; G02F 1/13394; G02F 1/134345; G02F 1/134363; G02F 1/136204; G02F 1/136209; G02F 1/136259; G02F 1/136295; G02F 1/1503; G02F 2201/121; G02F 2201/123; G02F 2202/16
  See application file for complete search history.

(56) References Cited

FOREIGN PATENT DOCUMENTS

| | | | | |
|---|---|---|---|---|
| CN | 109273458 | | 1/2019 | |
| JP | 3099048 | * | 2/1990 | .............. G09F 9/37 |
| JP | H1124102 | | 1/1999 | |
| TW | 201118494 | | 6/2011 | |

OTHER PUBLICATIONS

"Office Action of Taiwan Counterpart Application", issued on Mar. 31, 2021, p. 1-p. 9.
"Office Action of China Counterpart Application", issued on Jul. 16, 2024, p. 1-p. 7.

* cited by examiner

ELECTROPHORETIC DISPLAY DEVICE AND MANUFACTURING METHOD THEREOF

CROSS-REFERENCE TO RELATED APPLICATION

This application claims the priority benefit of Taiwan application serial no. 109128358, filed on Aug. 20, 2020. The entirety of the above-mentioned patent application is hereby incorporated by reference herein and made a part of this specification.

BACKGROUND

Technical Field

This disclosure relates to a display device and a manufacturing method thereof, and in particular to an electrophoretic display device and a manufacturing method thereof.

Description of Related Art

In general, a segmented electronic paper display has characteristics such as ultra-low power consumption, thinness, and durability. The segmented electronic paper display can display content clearly in direct sunlight, and the screen can still be displayed even when it is not connected to a power source. In a currently available segmented electrophoretic display, trace line marks in a background region, that is, traces of data lines, are reduced by controlling the waveform. The above-mentioned solution may make a product price competitive, but it does not allow the display to perform a partial update. In order to address the issue of the display not being able to perform a partial update, respectively setting up the background patterns and the data lines on opposite sides of a circuit board such as a flexible printed circuit (FPC) or a printed circuit board (PCB) and connected through conductive vias, is being adopted in the related art. Since the data lines are set up on a different side from the background patterns, the traces of the data lines will not be seen during an update. However, the above-mentioned solution requires additional driver chips for driving, such as a plastic package or a chip on film (COF), therefore increasing the manufacturing cost. Another method is to make a same structure as the circuit board such as the FPC or the PCB through three photomask manufacturing processes. However, in addition to the three photomask manufacturing processes being time-consuming and costly, it is not suitable for manufacturers capable of only one photomask manufacturing process.

SUMMARY

The disclosure provides an electrophoretic display device, which can prevent the known occurrence of traces of signal lines.

The disclosure provides a manufacturing method of an electrophoretic display device, configured to manufacture the above-mentioned electrophoretic display device, which can prevent the known occurrence of the traces of the signal lines without increasing the number of photomasks and having a lower manufacturing process cost.

The electrophoretic display device of the disclosure includes a substrate, a first conductive layer, multiple insulating patterns, a second conductive layer, an adhesive layer, and an electrophoretic display film. The first conductive layer is disposed on the substrate, and includes multiple background patterns and multiple signal lines. Each of the signal lines is located between two adjacent background patterns. Each of the insulating patterns covers each of the signal lines and bridges to the two adjacent background patterns. The second conductive layer includes multiple conductive patterns. Each of the conductive patterns covers each of the insulating patterns and bridges to the two adjacent background patterns. The adhesive layer is disposed on and in direct contact with the background pattern and the second conductive layer. The electrophoretic display film is disposed above the adhesive layer.

In an embodiment of the disclosure, the material of the insulating patterns includes silicon oxide.

In an embodiment of the disclosure, the material of the second conductive layer is different from the material of the first conductive layer, and the material of the second conductive layer includes a conductive polymer, such as poly (3,4-ethylenedioxythiophene) (PEDOT).

In an embodiment of the disclosure, the electrophoretic display film includes a display medium layer and a common electrode. The display medium layer includes an electrophoresis solution and multiple charged particles of different colors distributed in the electrophoresis solution. The common electrode is disposed on the display medium layer.

In an embodiment of the disclosure, the electrophoretic display device further includes an adhesive layer covering the second conductive layer. The electrophoretic display film is bonded to the substrate through the adhesive layer.

The manufacturing method of the electrophoretic display device of the disclosure includes the following steps. A first conductive layer is formed on a substrate. The first conductive layer includes multiple background patterns and multiple signal lines, and each of the signal lines is located between two adjacent background patterns. Multiple insulating patterns are formed by screen printing. Each of the insulating patterns covers each of the signal lines and bridges to the two adjacent background patterns. A second conductive layer is formed by screen printing. The second conductive layer includes multiple conductive patterns, and each of the conductive patterns covers each of the insulating patterns and bridges to the two adjacent background patterns. An electrophoretic display film is disposed above the second conductive layer.

In an embodiment of the disclosure, the adhesive layer is formed to cover the background pattern and the second conductive layer. The electrophoretic display film is bonded to the substrate through the adhesive layer.

In an embodiment of the disclosure, the material of the insulating pattern includes silicon oxide.

In an embodiment of the disclosure, the material of the second conductive layer is different from the material of the first conductive layer, and the material of the second conductive layer includes a conductive polymer, such as poly (3,4-ethylenedioxythiophene) (PEDOT).

In an embodiment of the disclosure, the electrophoretic display film includes a display medium layer and a common electrode. The display medium layer includes an electrophoresis solution and multiple charged particles of different colors distributed in the electrophoresis solution. The common electrode is disposed on the display medium layer.

Based on the above, in the electrophoretic display device and its manufacturing method of the disclosure, the insulating patterns insulating the signal lines are first formed by screen printing. Subsequently, the conductive patterns that cover the insulating patterns and bridge to the corresponding two adjacent background patterns are formed by screen printing. As a result, the second conductive layer including the multiple conductive patterns may have a same potential as the background patterns, so as to shield an electric field generated by the signal lines. When the electric field of the signal lines is shielded by the second conductive layer, the traces of the signal lines will not be generated. In short, by forming the insulating patterns and the second conductive layer through screen printing, the number of masks is reduced without adopting the photolithography process, and the disclosure can have a lower manufacturing process cost.

To make the above-mentioned features and advantages more comprehensible, several embodiments accompanied by drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
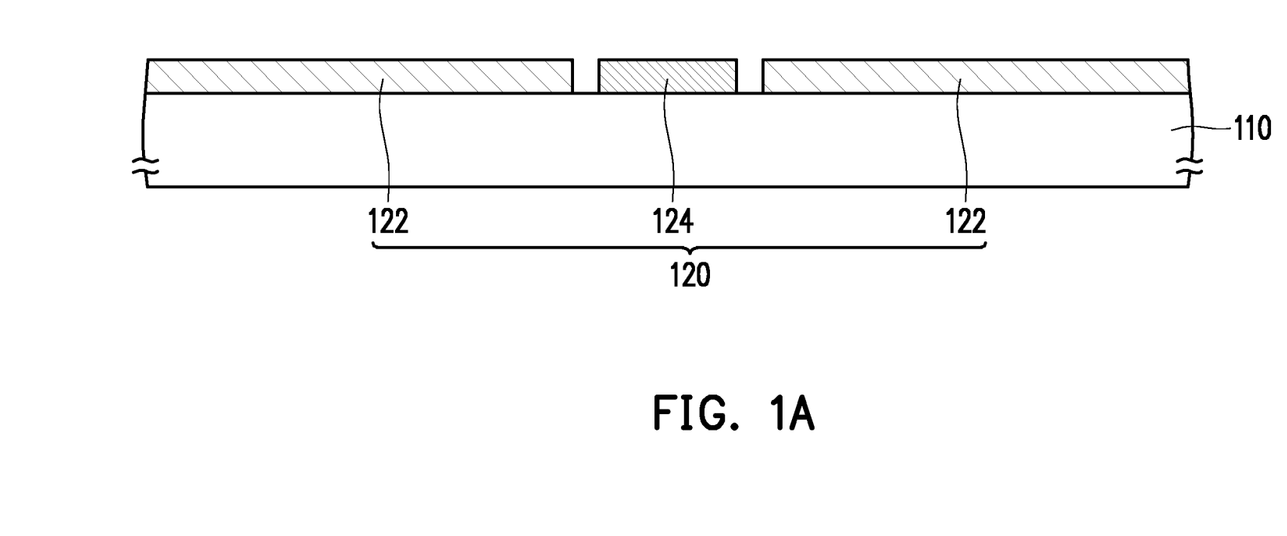
FIGS. 1A to 1D are cross-sectional schematic views of a manufacturing method of an electrophoretic display device according to an embodiment of the disclosure.
Figure 1B:
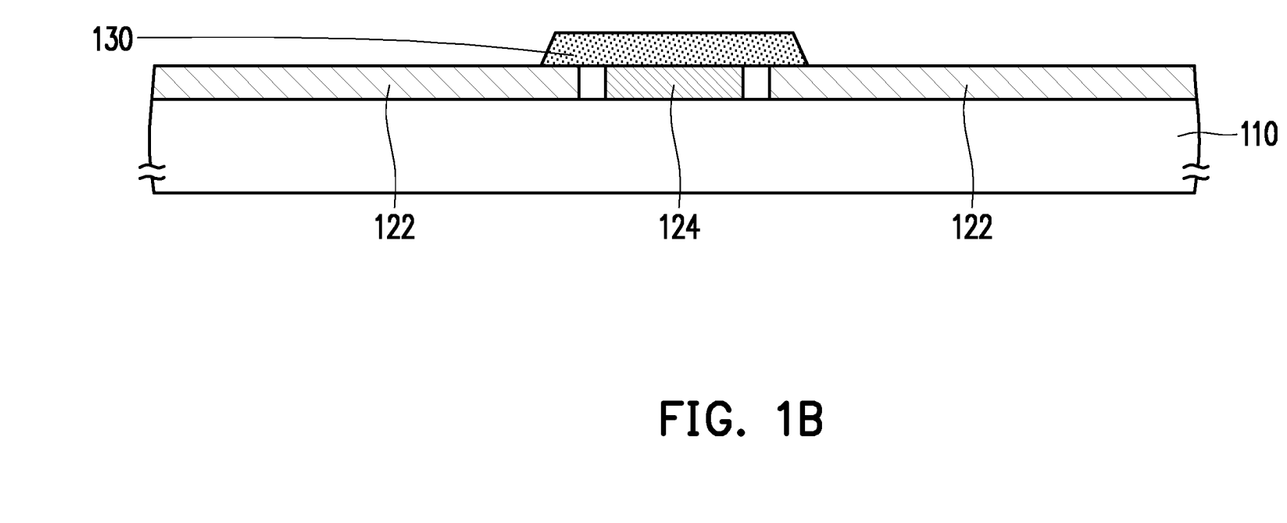
Figure 1C:
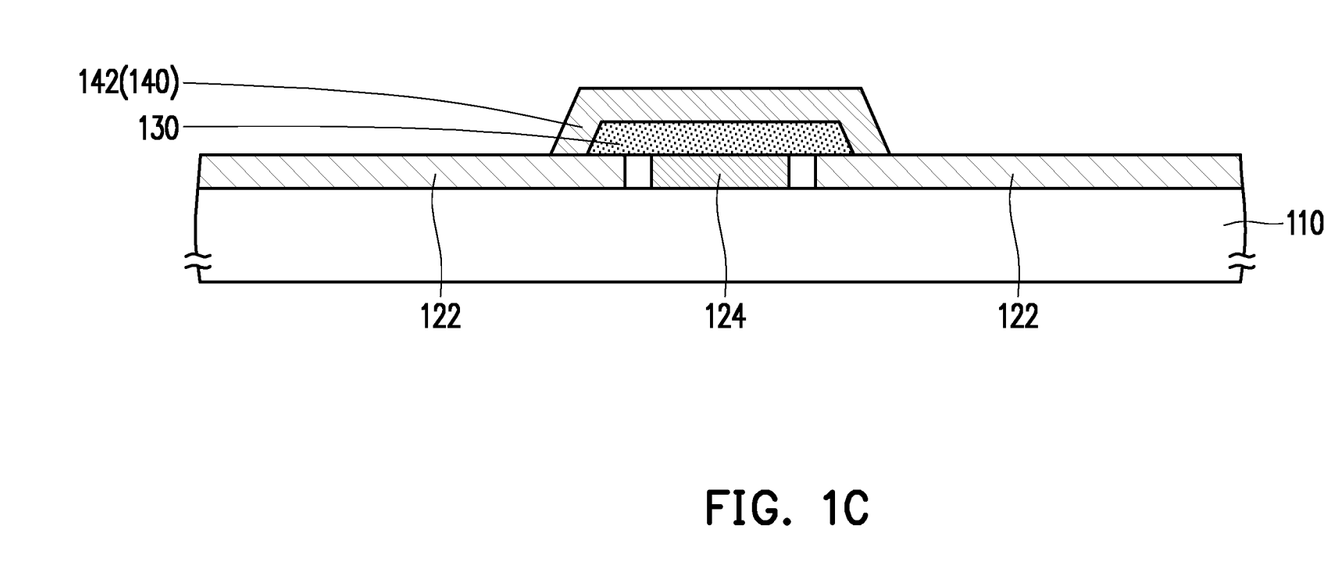

FIGS. 1A to 1D are cross-sectional schematic views of a manufacturing method of an electrophoretic display device according to an embodiment of the disclosure. FIGS. 2A to 2C are top schematic views of FIGS. 1A to 1C, respectively. It should be noted that FIGS. 1A to 1C are cross-sectional schematic views taken along line I-I in FIGS. 2A to 2C, respectively.

First of all, with reference to FIGS. 1A and 2A concurrently, in a manufacturing method of the electrophoretic display device of the embodiment, a first conductive layer 120 is formed on a substrate 110. The method of forming the first conductive layer 120 includes performing a process of photoresist coating, exposure, development, and etching. That is, the first conductive layer 120 is formed by photolithography. Furthermore, the first conductive layer 120 of the embodiment includes multiple background patterns 122 and multiple signal lines 124. Each of the signal lines 124 is located between two adjacent background patterns 122. Here, the substrate 110 is, for example, a glass substrate, a flexible substrate, or other appropriate substrates, and the signal line 124 is, for example, a data line, but the disclosure is not limited thereto. The material of the first conductive layer 120 is, for example, a transparent conductive material, such as indium oxide, tin oxide, indium tin oxide, or indium zinc oxide, but is not limited thereto. The multiple signal lines 124 are configured to transmit signals to foreground patterns 170, in which color or gray scale to be displayed by the foreground patterns 170 is transmitted through the signal lines 124. The background patterns 122 and the foreground patterns 170 have different colors or gray scales.

Next, with reference to FIGS. 1B and 2B concurrently, multiple insulating patterns 130 are formed by screen printing. The material of the insulating pattern 130 is, for example, silicon oxide or other suitable insulating materials, which is not limited by the disclosure. In the embodiment, each of the insulating patterns 130 covers each of the signal lines 124 and bridges to the two adjacent background patterns 122. In other words, the insulating pattern 130 of the embodiment may be regarded as a bridge, which completely covers the signal line 124 and bridges to the two adjacent background patterns 122. In other words, an orthographic area of the insulating pattern 130 on the substrate 110 is larger than an orthographic area of the corresponding signal line 124 on the substrate 110. It should be noted that the insulating patterns 130 here are to insulate the signal lines 124, and for the reliability of subsequent processes, the insulating patterns 130 must be connected to the corresponding two adjacent background patterns 122 to avoid leakage in the subsequent processes and affecting the function of the first conductive layer 120.

After that, with reference to FIGS. 1C and 2C concurrently, a second conductive layer 140 is formed by screen printing. The second conductive layer 140 includes multiple conductive patterns 142, and each of the conductive patterns 142 covers each of the insulating patterns 130 and bridges to the two adjacent background patterns 122. In other words, the conductive patterns 142 of the embodiment are separated from each other and are respectively set up corresponding to the insulating patterns 130. Here, the material of the second conductive layer 140 is different from the material of the first conductive layer 120. The material of the second conductive layer 140 is, for example, an organic polymer conductive material, such as a conductive polymer poly(3,4-ethylenedioxythiophene) (PEDOT) or other conductive materials, but is not limited thereto. Since the conductive patterns 142 of the second conductive layer 140 in the embodiment are bridged to the corresponding two adjacent background patterns 122, the second conductive layer 140 and the background patterns 122 have a same potential (that is, a short circuit is formed). As a result, an electric field generated by the signal lines 124 may be shielded by the setup of the conductive patterns 142, and when the electric field of the signal lines 124 is shielded, traces of the signal lines 124 will not be generated.

Figure 1D:
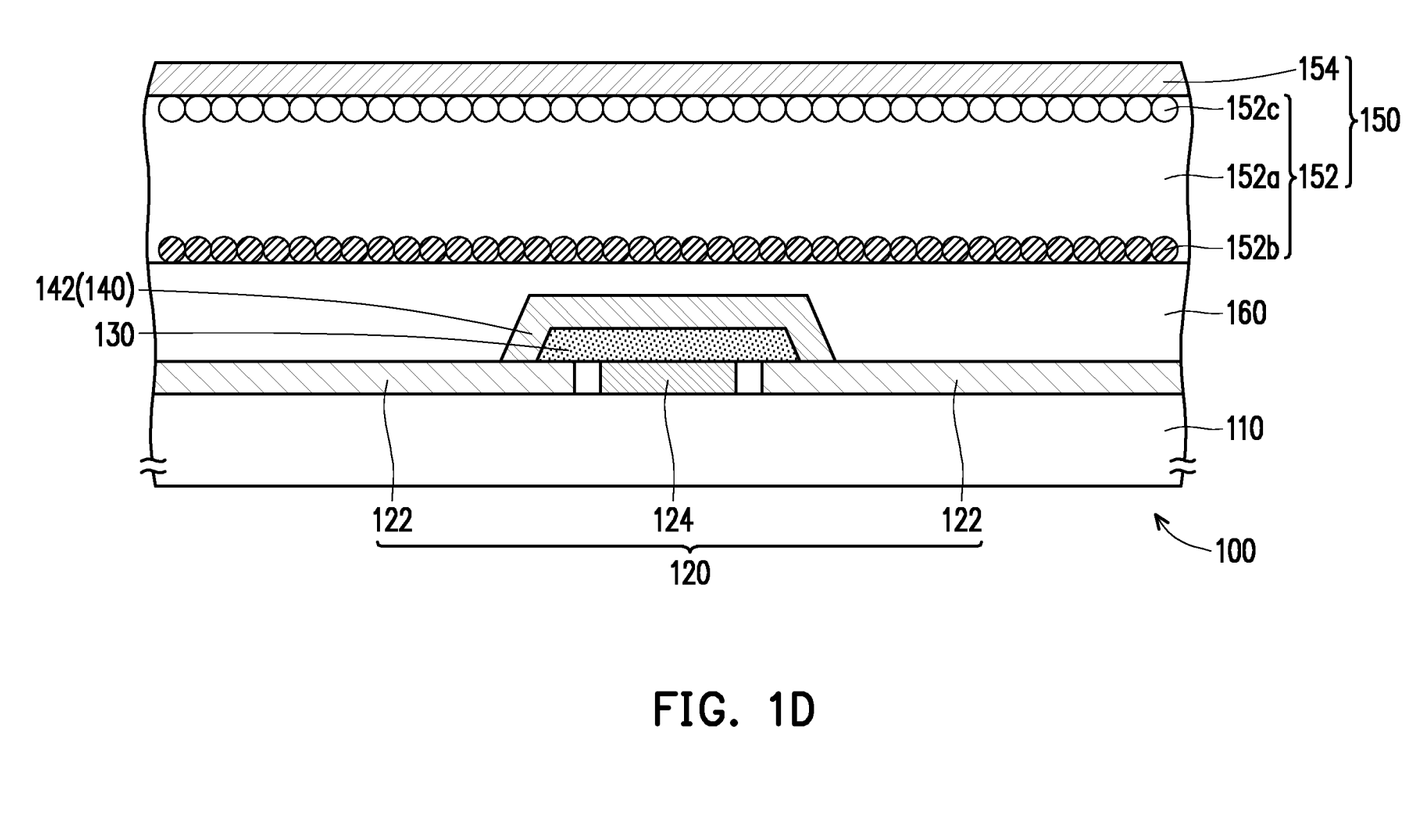
Figure 2A:
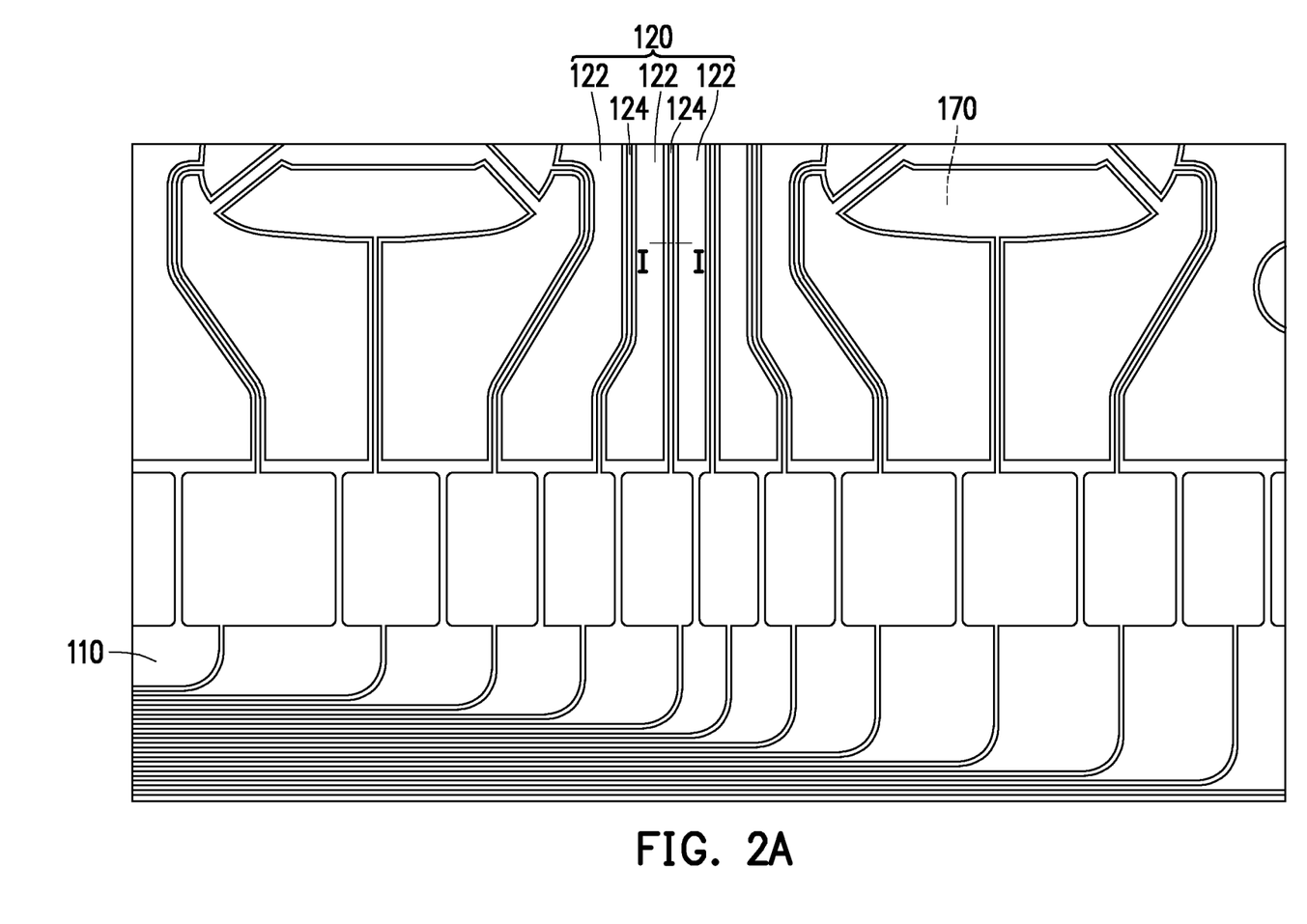
FIGS. 2A to 2C are top schematic views of FIGS. 1A to 1C, respectively.
Figure 2B:
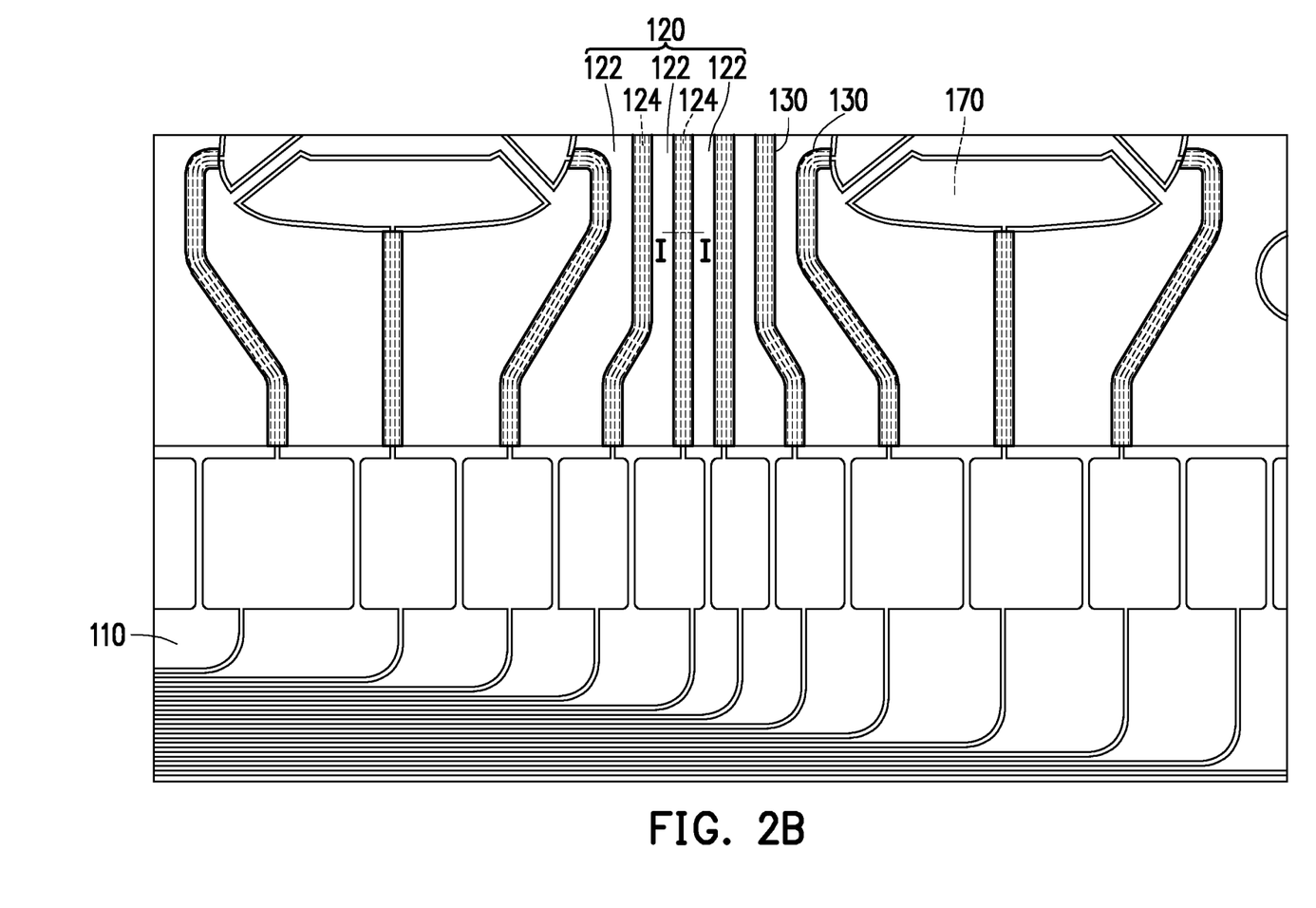
Figure 2C:
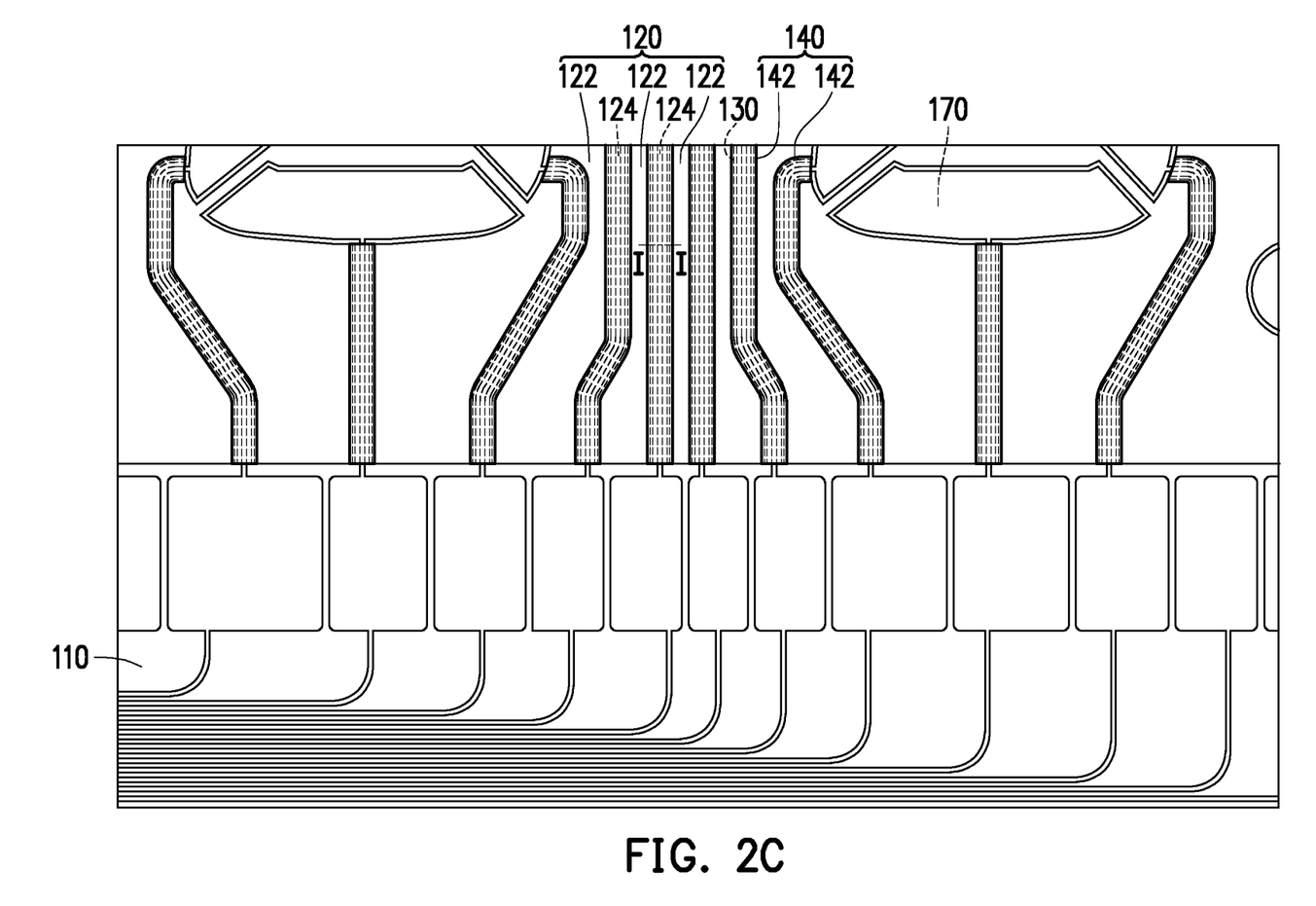

Next, with reference to FIG. 1D, an adhesive layer 160 may be formed to cover the second conductive layer 140. Here, the adhesive layer 160 covers the conductive patterns 142 of the second conductive layer 140 and the background patterns 122 of the first conductive layer 120.

Finally, with reference to FIG. 1D again, an electrophoretic display film 150 is disposed above the second conductive layer 140. The electrophoretic display film 150 may be bonded to the substrate 110 through the adhesive layer 160. Here, the electrophoretic display film 150 includes a display medium layer 152 and a common electrode 154. The display medium layer 152 includes an electrophoresis solution 152a and multiple charged particles of different colors distributed in the electrophoresis solution 152a, such as multiple black charged particles 152b and multiple white charged particles 152c, but the colors are not limited thereto. The common electrode 154 is disposed on the display medium layer 152, which means that the display medium layer 152 is located between the common electrode 154 and the adhesive layer 160. As of now, the manufacture of the electrophoretic display device 100 is completed. The electrophoretic display device 100 is, for example, a segmented electrophoretic display device. In another embodiment, the adhesive layer 160 may be formed on the electrophoretic display film 150 first. That is, the electrophoretic display film 150 includes the adhesive layer 160, the display medium layer 152 and the common electrode 154. After that, the electrophoretic display film 150 may be directly bonded to the substrate 110 through the adhesive layer 160.

With reference to FIG. 1D again, structurally, the electrophoretic display device 100 of the embodiment includes the substrate 110, the first conductive layer 120, the insulating patterns 130, the second conductive layer 140, and the electrophoretic display film 150. The first conductive layer 120 is disposed on the substrate 110, and includes the background patterns 122 and the signal lines 124. Each of the signal lines 124 is located between the two adjacent background patterns 122. Each of the insulating patterns 130 covers each of the signal lines 124 and bridges to the two adjacent background patterns 122. The second conductive layer 140 includes the conductive patterns 142. Each of the conductive patterns 142 covers each of the insulating patterns 130 and bridges to the two adjacent background patterns 122. The electrophoretic display film 150 is disposed above the second conductive layer 140. The electrophoretic display film 150 includes the display medium layer 152 and the common electrode 154. The common electrode 154 is disposed on the display medium layer 152. The display medium layer 152 includes the electrophoresis solution 152a, and the black charged particles 152b and the white charged particles 152c distributed in the electrophoresis solution 152a. In addition, the electrophoretic display device 100 further includes the adhesive layer 160. The adhesive layer 160 covers the second conductive layer 140, and the electrophoretic display film 150 is bonded to the substrate 110 through the adhesive layer 160.

In the embodiment, the material of the insulating patterns 130 is, for example, silicon oxide or other insulating materials. The insulating patterns 130 are formed on the signal lines 124 by screen printing and bridge to the two adjacent background patterns 122, so as to insulate the signal lines 124 and the second conductive layer 140. Furthermore, in the embodiment, the second conductive layer 140 is formed by screen printing. The conductive patterns 142 of the second conductive layer 140 cover the insulating patterns 130 and bridge to the corresponding two adjacent background patterns 122, so that the second conductive layer 140 and the background patterns 122 have the same potential (that is, a short circuit is formed). As a result, the electric field generated by the signal lines 124 may be shielded by the setup of the conductive patterns 142, and when the electric field of the signal lines 124 is shielded, the traces of the signal lines 124 will not be generated. In addition, the material of the second conductive layer 140 of the embodiment is different from the material of the first conductive layer 120. The material of the second conductive layer 140 is, for example, an organic polymer conductive material, such as the conductive polymer poly(3,4-ethylenedioxythiophene) (PEDOT) or other conductive materials, but is not limited thereto.

In short, compared with the known adoption of controlling the waveform or using a photolithography process to avoid generation of the traces of the data lines, the electrophoretic display device 100 of the embodiment adopts the screen printing method to form the insulating patterns 130 and the second conductive layer 140. Therefore, the embodiment can effectively reduce the number of masks required to maintain only one photomask manufacturing process. Furthermore, because there is no need to match the waveform, the electrophoretic display device 100 may perform a partial update. In addition, compared with the known display in which display electrodes and the data lines are respectively set up on opposite sides of the circuit board and connected through conductive vias, the embodiment does not require additional drivers and does not require the adoption of three photomask manufacturing processes, therefore effectively reducing the manufacturing cost.

In summary, in the electrophoretic display device and its manufacturing method of the disclosure, the insulating patterns insulating the signal lines are first formed by screen printing. Subsequently, the conductive patterns that cover the insulating patterns and bridge to the corresponding two adjacent background patterns are formed by screen printing. As a result, the second conductive layer including the multiple conductive patterns may have the same potential as the background patterns, so as to shield the electric field generated by the signal lines. When the electric field of the signal lines is shielded by the second conductive layer, the traces of the signal lines will not be generated. In short, by forming the insulating patterns and the second conductive layer through screen printing, and reducing the number of masks without adopting the photolithography process, the disclosure can have a lower manufacturing process cost.

Although the disclosure has been described with reference to the above-mentioned embodiments, they are not intended to limit the disclosure. It is apparent that any one of ordinary skill in the art may make changes and modifications to the described embodiments without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. An electrophoretic display device, comprising:
a substrate;
a first conductive layer, disposed on the substrate, and comprising a plurality of background patterns and a plurality of signal lines, wherein each of the signal lines is located between two adjacent background patterns;
a plurality of insulating patterns, wherein each of the insulating patterns covers the each of the signal lines and bridges to the two adjacent background patterns;
a second conductive layer, comprising a plurality of conductive patterns, wherein each of the conductive patterns covers the each of the insulating patterns and bridges to the two adjacent background patterns, and each of the conductive patterns is in direct contact with the two adjacent the background patterns, wherein a projection of the second conductive layer on the substrate overlaps a projection of the signal line on the substrate;
an adhesive layer, disposed on and in direct contact with the background pattern and the second conductive layer; and
an electrophoretic display film, disposed above the adhesive layer.

2. The electrophoretic display device according to claim 1, wherein a material of the insulating patterns comprises silicon oxide.

3. The electrophoretic display device according to claim 1, wherein a material of the second conductive layer is different from a material of the first conductive layer, and the material of the second conductive layer comprises a conductive polymer.

4. The electrophoretic display device according to claim 1, wherein the electrophoretic display film comprises:
a display medium layer, comprising an electrophoresis solution and a plurality of charged particles of different colors distributed in the electrophoresis solution; and
a common electrode, disposed on the display medium layer.

5. The electrophoretic display device according to claim 1, wherein the adhesive layer covers the background pattern and the second conductive layer, and the electrophoretic display film is bonded to the substrate through the adhesive layer.

6. A manufacturing method of an electrophoretic display device, comprising:
- forming a first conductive layer on a substrate, wherein the first conductive layer comprises a plurality of background patterns and a plurality of signal lines, and each of the signal lines is located between two adjacent background patterns;
- forming a plurality of insulating patterns by screen printing, wherein each of the insulating patterns covers the each of the signal lines and bridges to the two adjacent background patterns;
- forming a second conductive layer by screen printing, wherein the second conductive layer comprises a plurality of conductive patterns, and each of the conductive patterns covers the each of the insulating patterns and bridges to the two adjacent background patterns, and each of the conductive patterns is in direct contact with the two adjacent the background patterns, wherein a projection of the second conductive layer on the substrate overlaps a projection of the signal line on the substrate;
- forming an adhesive layer directly on the background patterns and second conductive layer; and
- disposing an electrophoretic display film above the adhesive layer.

7. The manufacturing method of the electrophoretic display device according to claim 6, wherein the electrophoretic display film is bonded to the substrate through the adhesive layer, wherein the adhesive layer covers the background patterns and the second conductive layer.

8. The manufacturing method of the electrophoretic display device according to claim 6, wherein a material of the insulating patterns comprises silicon oxide.

9. The manufacturing method of the electrophoretic display device according to claim 6, wherein a material of the second conductive layer is different from a material of the first conductive layer, and the material of the second conductive layer comprises a conductive polymer.

10. The manufacturing method of the electrophoretic display device according to claim 6, wherein the electrophoretic display film comprises:
- a display medium layer, comprising an electrophoresis solution and a plurality of charged particles of different colors distributed in the electrophoresis solution; and
- a common electrode, disposed on the display medium layer.

* * * * *